(No Model.) 3 Sheets—Sheet 2.

T. F. ROWLAND, Jr.
WELDING MACHINE.

No. 468,009. Patented Feb. 2, 1892.

Witnesses:
Raphaël Netter
Robt. F. Gaylord

Inventor
Thos. F. Rowland Jr.
by Duncan & Page
Attorneys.

(No Model.) 3 Sheets—Sheet 3.

T. F. ROWLAND, Jr.
WELDING MACHINE.

No. 468,009. Patented Feb. 2, 1892.

Witnesses:
Raphail Netter
Robt. F. Gaylord

Inventor
Thomas F. Rowland Jr.
by Duncan & Page
Attorneys

UNITED STATES PATENT OFFICE.

THOMAS F. ROWLAND, JR., OF BROOKLYN, NEW YORK, ASSIGNOR TO THE CONTINENTAL IRON WORKS, OF SAME PLACE.

WELDING-MACHINE.

SPECIFICATION forming part of Letters Patent No. 468,009, dated February 2, 1892.

Application filed September 5, 1891. Serial No. 404,834. (No model.)

*To all whom it may concern:*

Be it known that I, THOMAS F. ROWLAND, Jr., of Brooklyn, in the county of Kings and State of New York, have invented certain new and useful Improvements in Welding-Machines, of which the following is a specification, reference being had to the accompanying drawings.

The present invention relates, generally, to machines for welding plates together, especially in the form of tubes or like structures. The invention is applicable to that class of welding-machines in which oppositely-arranged welding-rolls are mounted on the free ends of a pair of rigidly-connected parallel arms, which arms are supported at their other ends on or from a suitable base, such machines being ordinarily employed to weld together the longitudinal or lateral seams of heavy tube or pipe blanks, the blank being supported during the welding process on a carriage adapted to move it along and over one of the arms of the machine as the formation of the seams progress.

The object of this invention is to provide such a welding-machine with an improved form of blank-supporting platform or table whereby the blank can be automatically manipulated both in a lateral and in a circular or angular direction relative to the welding-rolls. In this latter connection it is to be understood that in welding together the overlapping edges of a pipe-blank, particularly when the blank is of heavy or comparatively thick metal, it is required to operate with the welding-rolls upon the blank at either side of the line of the seam, not only to produce an efficient seam and reduce the thickness of the overlapping edges, but also to produce evenness of surface and the greatest practical cylindricity of the finished tube or pipe.

The various features of construction of a machine embodying my improvements will be described, and in the claims to follow the description I shall set forth the combination of elements I consider as novel and of my invention.

Figure 1:
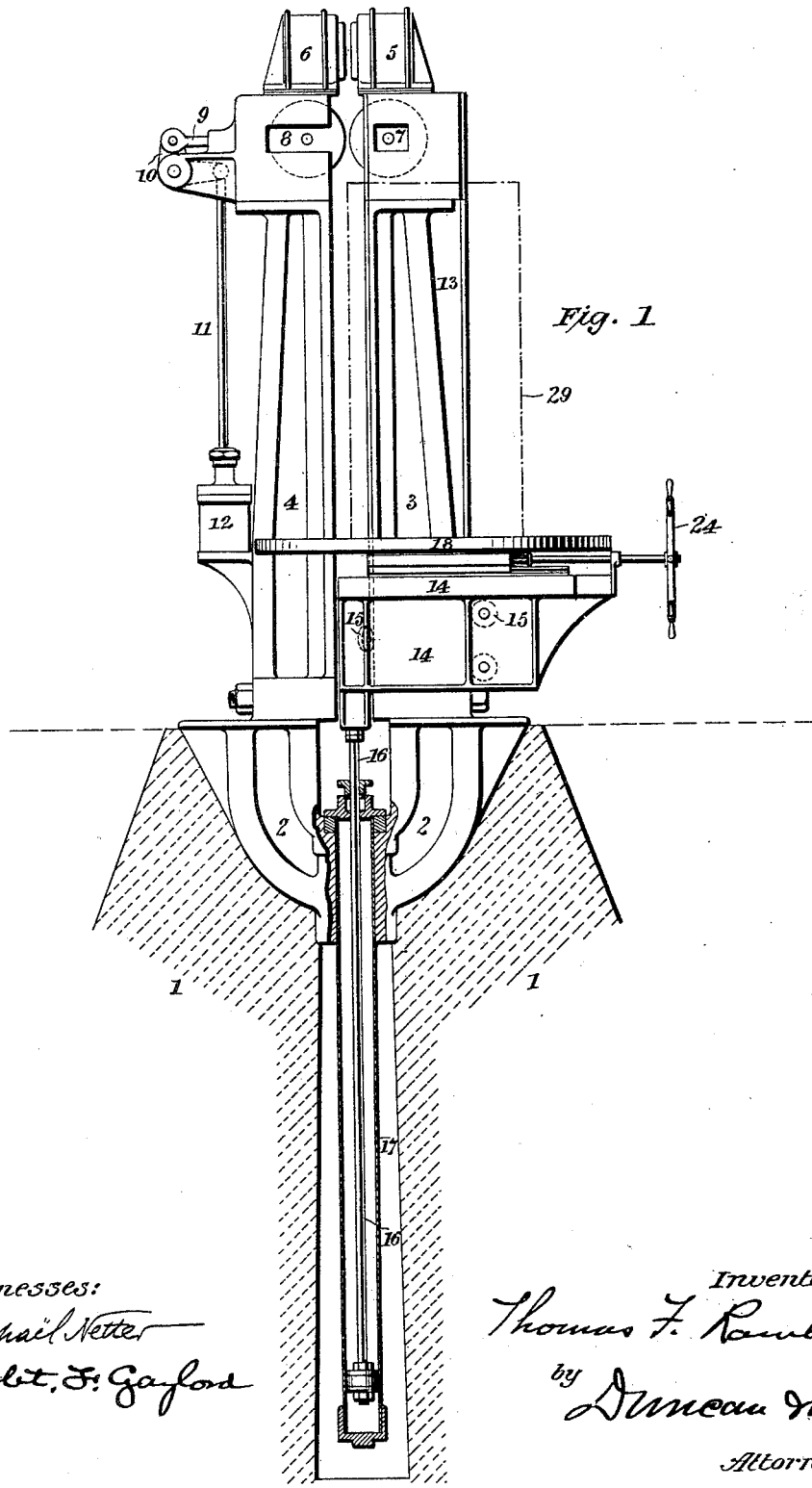
Figure 2:
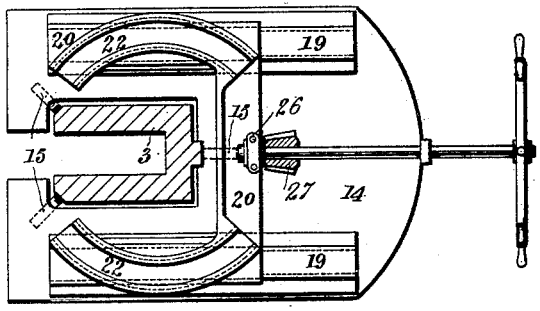
Figure 3:
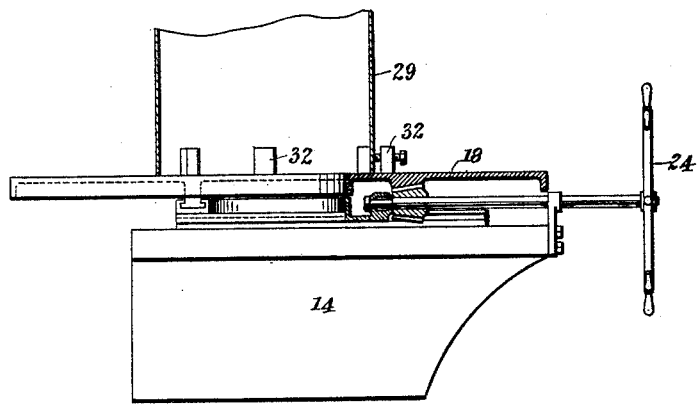
Figure 5:
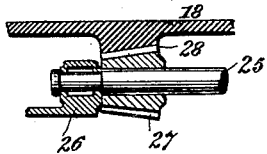
Figure 6:
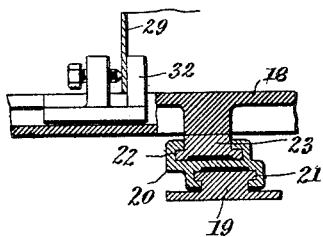
Figure 4:
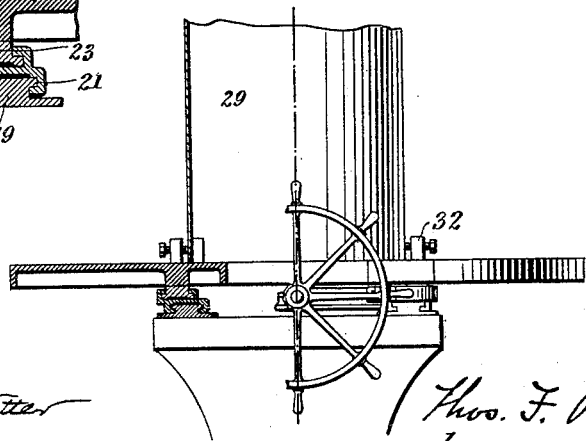

In the drawings, Figure 1 represents an elevation view of a welding-machine, the arms of which, carrying the welding-rolls, being arranged vertically. Fig. 2 is a plan view of the carriage of the blank-carrying table. Fig. 3 is a central vertical section of the same, the table being shown in position and also in central vertical section. Fig. 4 is an elevation view of the blank table and carriage from the right hand of Fig. 3, the parts being in partial section. Fig. 5 is a detail section on the vertical sectional line of Fig. 4. Fig. 6 is a detail cross-section of the guide and retaining connections between the table and its carriage. Figs. 7, 8, 9, and 10 are plan views of the blank-carrying table, showing the latter in various positions of adjustment on the carriage.

Referring to the views in detail, 1 represents the masonry groundwork of the machine. 2 is the base of the machine. 3 and 4 represent the welding-roll arms. 5 and 6 are the furnaces for heating the blank, they being preferably supported on the upper or outer ends of the arms 3 and 4, though in some cases these furnaces may be supported independently of such arms. 7 is the fixed and 8 the adjustable welding-roll, which latter is moved to and from the other roll by the rod 9, elbow-lever 10, and piston 11 of the hydraulic or steam cylinder 12. 13 is a guide-rail on the arm 3. On this guide-rail on the arm 3 travels the blank-carrying carriage 14, the friction-rolls 15 being interposed between the carriage and the guide-rail and arm 3. This carriage is recessed for the passage of the arm 3, and at its inner side, between the arms 3 and 4, it is attached to the piston-rod 16 of the cylinder 17, which is firmly attached to and extends below the base 2. This cylinder and its piston constitute a hydraulic apparatus by which the carriage 14 may be raised and lowered, though steam or compressed air may be similarly employed. These features of this invention are old so far as concerns the present improvements, they forming the subject-matter of United States Letters Patent No. 412,122, of October 1, 1889, granted to Thomas F. Rowland.

18 is the blank-carrying table. This is a large strong disk-like structure mounted on the carriage 14 so as to have angular motion around its own axis and longitudinal motion to and from the arm 3.

19 represents two parallel flanged or T- shaped rails fixed to the top face of the carriage 14.

20 is a slide-frame, which is mortised or grooved at 21 to receive the rails 19, and the shape of the mortise is complementary to that of the rails, so that the parts of the mortise engage and hold to the rails, but permit longitudinal motion of the frame on the rails, the connection of the rails and slide being in effect a sliding dovetail connection. The slide is provided upon its upper face with two segmental grooves or mortises 22 in cross-sectional form, like that of the mortise 21, and 23 is a correspondingly-shaped rail fixed to and projecting downwardly from the under face of the table 18.

24 is a hand-wheel, the shaft 25 of which is longitudinally movable in a guide on the carriage, but is pivotally fixed in the lug 26 on the slide-frame 20 and carries a bevel-gear 27, that engages with the circular rack 28 on the under side of the table. It will now be plain that the blank-carrying table can be moved to and from the arms 3 and 4 and the rolls carried thereon to adjust the table 18 and the blank 29 thereon horizontally in reference to such rolls. This adjustment may be effected by a hand-bar properly applied to the table, using the carriage as a fulcrum-bearing, or applied to the blank when secured to the table and using the roll-carrying arms to work against. Also, that by turning the hand-wheels the blank can be turned circularly around its axis, so that the welding-rolls may be brought to act upon the blank to as great a distance to either side of the seam as may be desired.

Figure 7:
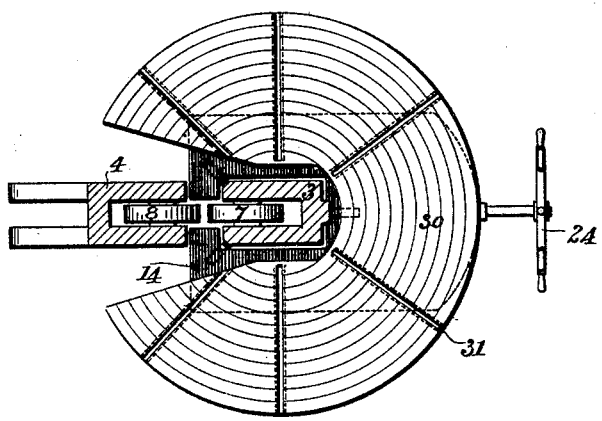

In Fig. 7 I show a plan view of the blank-table in its closest adjustment to the roll-carrying arms. This table is provided with concentric lines or grooves 30, which indicate how to center a blank to the table. In radial grooves 31 are arranged sliding dogs 32, Figs. 3, 4, and 6, of a common form, adapted to clamp the lower end of the blank and hold the same securely to the table.

Figure 8:
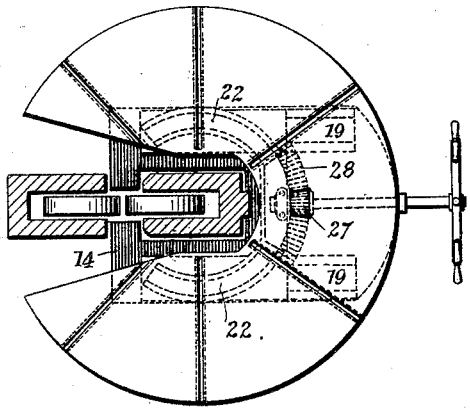

In Fig. 8 the centering-lines 30 of Fig. 7 are omitted and the positions of the parts beneath the table are shown by dotted lines.

Figure 9:
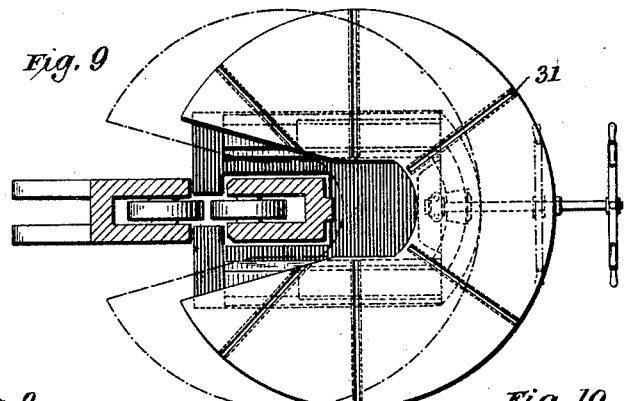

In Fig. 9 the table is shown as at practically its greatest horizontal adjustment laterally from the roll-carrying arms, which might be the adjustment for a very large blank.

Figure 10:
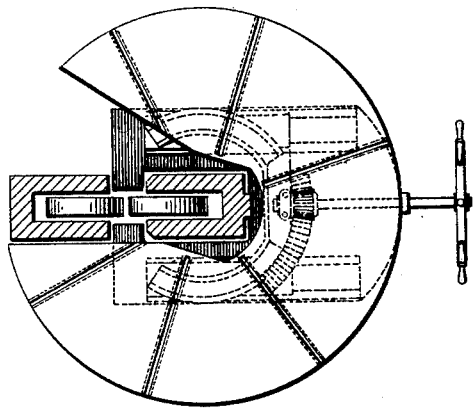

Fig. 10 shows one position of the angular adjustment of the table, whereby the blank is turned circularly between the welding-rolls.

The operation of the machine is this: First, the blank, properly bent into cylindrical form and having its overlapping edges tacked together at two or more points, is secured upon the table and centered to the axis of the same. One end of the blank at the seam part will now be brought to between the furnaces to be heated, after which the blank will be lowered, so that the heated parts come between the welding-rolls. The movable roll will then be forced toward its mate and so as to strongly compress the overlapping edges of metal, and the carriage and table be caused to oscillate vertically by the action of the hydraulic piston at the base of the machine. This will effect the union of the edges of the blanks, and the heating and welding will progress by these alternate steps until the whole seam has been closed. It will of course be understood that as any one portion is welded down such portion is finished off and the cylinder to both sides of the seam left as perfect in shape as is practically possible. In doing this the blank will be turned circularly to either side of the seam, and in such position the lateral parts of the seam or those adjacent thereto will be submitted to the welding-rolls. The amount and extent of this last-named work will depend upon the thickness of the blank, the degree of perfection of the weld as produced by the first action of the rolls, and upon other conditions well known to producers of such products, and do not therefore require special or further explanation here.

I have shown the blank-carrying table as applied to a machine the parallel arms of which are arranged vertically; but such a table may as readily be applied to such arms when they are arranged horizontally or in other position. The arrangement illustrated is, however, preferred for reasons particularly of economy of ground-space and shop-room and because the carriage and blank are operated in line with the action of gravity, and when so operated are least subject to irregular or unsteady motion, a condition essential to the ready forming of a good seam.

What is claimed as new is—

1. The combination, in a welding-machine, of two parallel and rigidly-connected arms having welding-rolls journaled in their free ends, and a blank-carrying table mounted to move longitudinally on one of said arms and being adjustable laterally to and from said arm.

2. The combination, in a welding-machine, of two parallel and rigidly-connected arms bearing welding-rolls at their free ends, and a blank-carrying table mounted to move longitudinally on one of said arms and being angularly adjustable relative to said arm.

3. The combination, in a welding-machine, of two arms carrying welding-rolls, and a blank-carrying table mounted to have longitudinal motion on one of said arms and being laterally and angularly adjustable on said arm.

4. The combination of the arms 3 and 4, the carriage 14, movably mounted on the arms 3, and the blank-carrying table 18, partially surrounding the said arms and circularly and longitudinally adjustable on the said carriage, substantially as described and set forth.

5. The combination of the arms 3 and 4, the carriage 14, movable along the said arms, the piston 16 and cylinder 17, operably attached to and for moving said carriage, and the table 18, partially surrounding said arms and circularly and longitudinally adjustable on the said carriage, as and for the purpose set forth.

6. In combination with the arms 3 and 4, the carriage 14, movably mounted on the said arms, the longitudinal ways 19 on said carriage, the frame 20, sliding on said ways and having the circular groove 22, and the blank-carrying table 18, partially surrounding said arms and bearing the circular rails 23, engaging and movable in the said grooves 22 of the carriage, as and for the purpose set forth.

THOS. F. ROWLAND, JR.

Witnesses:
   WARREN E. HILL,
   GEORGE ROWLAND.